No. 820,521. PATENTED MAY 15, 1906.
C. A. ROLFE.
ELECTRICAL PROTECTIVE DEVICE.
APPLICATION FILED JUNE 22, 1903.

Witnesses:
F. C. Barry
J. C. Lee

Inventor:
Charles A. Rolfe
by A. Miller Belfield
Attorney.

UNITED STATES PATENT OFFICE.

CHARLES A. ROLFE, OF ADRIAN, MICHIGAN, ASSIGNOR, BY MESNE ASSIGNMENTS, TO ROLFE ELECTRIC CO., OF ROCHESTER, NEW YORK, A CORPORATION OF NEW YORK.

ELECTRICAL PROTECTIVE DEVICE.

No. 820,521.      Specification of Letters Patent.      Patented May 15, 1906.

Application filed June 22, 1903. Serial No. 162,597.

*To all whom it may concern:*

Be it known that I, CHARLES A. ROLFE, a citizen of the United States, residing at Adrian, in the county of Lenawee and State of Michigan, have invented a certain new and useful Improvement in Electrical Protective Devices, of which the following is a full, clear, concise, and exact description, reference being had to the accompanying drawings, forming a part of this specification.

My invention relates to protective devices for protecting electrical circuits from the injurious effects of unduly strong currents.

The object of the invention is to provide a simple, inexpensive, and effective protective device of this kind.

Figure 1:
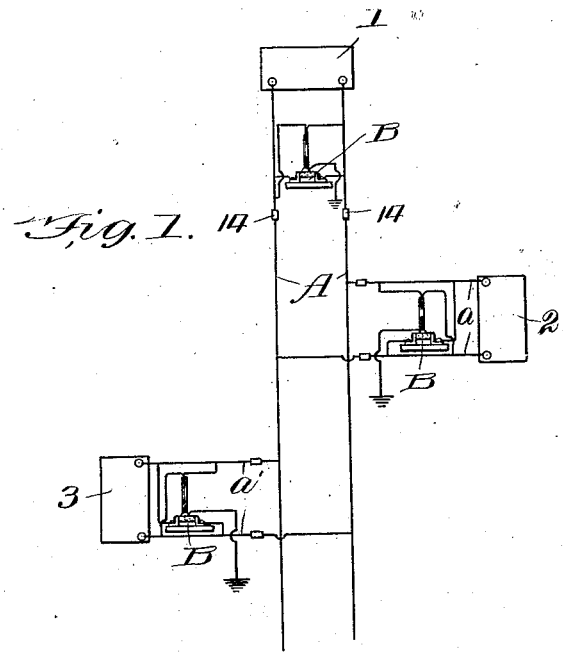
Figure 2:
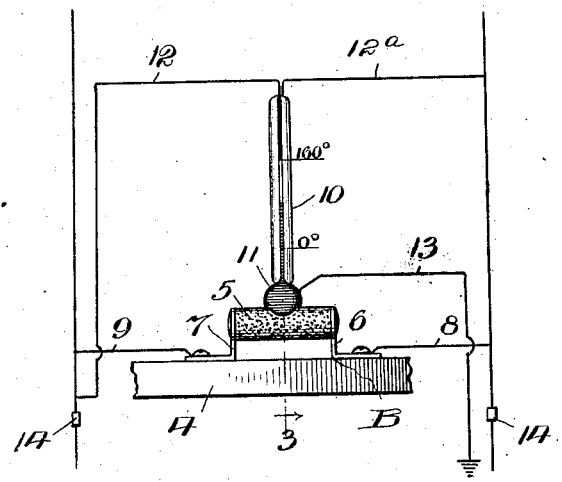
Figure 3:
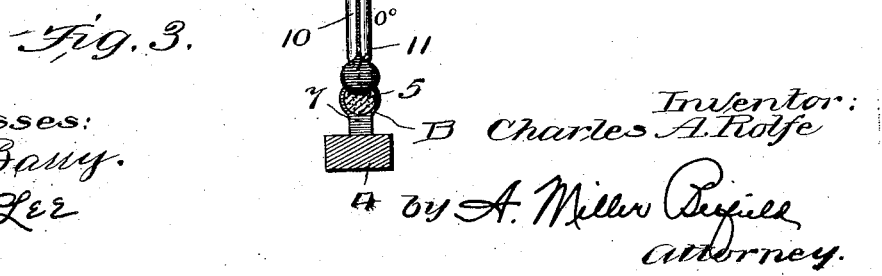

In the accompanying drawings, Figure 1 is a view of a protective circuit embodying my present invention and also in some measure the invention of an application filed by me, Serial No. 154,371, filed April 25, 1903. Fig. 2 is a view of the protector proper, and Fig. 3 is a section taken on line 3 3 in Fig. 2.

Referring first to Fig. 1, A is a main circuit, and *a a'* branch circuits, each containing an instrument to be protected, the instruments being indicated as 1, 2, and 3, respectively. In accordance with the invention of my said other application I provide a protective device and connect the same across the terminals of the instrument, the protective devices herein shown being indicated as B B B. Each of these devices consists of high-resistance material 5, such as graphite or carbon, suitably supported by and connected with terminals 6 and 7, mounted on the base 4. The terminals 6 and 7 are connected with the circuit-wires by suitable connecting-wires 8 and 9. A thermometer-tube 10 is mounted above the graphite stick 5, with its bulb 11 upon said stick and partially embedded in a cavity formed therein. The upper end of the tube 10 is connected by wires 12 and 12ª with the sides of the circuit which the instrument is protecting, and the bulb 11 is connected by a wire 13 with the ground.

The operation of the device is as follows: Under ordinary conditions and when a normal current is passing through the circuit a small portion of it passes through the conductors 8 and 9 and graphite stick 5; but this portion is insufficient to heat the graphite perceptibly. When the current becomes unduly strong, however, the graphite stick 5 becomes heated sufficiently to cause the mercury in the thermometer-bulb 10 to rise and form a connection between the wires 12 and 12ª. When this connection is formed, the circuit is short-circuited, thereby shunting the current from the instrument under protection and protecting same, and at the same time both sides of the circuit are grounded by the wire 13. The mercury-tube 10 can be set and arranged to operate at any desired temperature. As shown in Fig. 2, the wire 12 or an extension thereof is extended down to the point to which the mercury rises when the temperature is 160° Fahrenheit, this being the temperature at which it is desirable to cause the instrument to operate.

In my aforesaid other application I have shown generally and described a system by which the circuit is short-circuited upon the operation of a protective device by an unduly strong current, the object being to thus short-circuit the circuit and allow one protector to be used to protect an instrument, whereas two formerly have been employed, one on each side of the line. My present invention, it will be seen, is particularly adapted for use in connection with and upon that system.

I have also shown in the drawings, Figs. 1 and 2, fuses 14 14, arranged in the circuit under protection outside of the protective devices B B, these fuses being desirably inserted for the purpose of operating upon the intrusion upon the line of currents, whose strength increases very rapidly, the protectors B B, as well known, being intended more particularly for those unduly strong currents which rise very slowly, commonly known as "sneak-currents."

It will be understood that the construction and arrangement of the protective device herein shown can be varied and modified without departing from the spirit of my invention. Hence I wish to be understood as considering myself not limited to such specific arrangement or construction.

What I claim—

1. A device of the class specified, comprising a graphite stick, a tube containing mercury and having its lower end resting upon said graphite stick, and circuit connections controlled by said mercury.

2. A device of the class specified, comprising a graphite stick, a tube containing mercury and having its lower end resting upon said graphite stick, and ground and line connections controlled by the mercury in the tube.

In witness whereof I hereunto subscribe my name this 27th day of January, A. D. 1903.

CHARLES A. ROLFE.

Witnesses:
A. MILLER BELFIELD,
I. C. LEE.